United States Patent [19]

Joronen

[11] 4,270,489

[45] Jun. 2, 1981

[54] FISH-OPERATED AQUARIUM FEEDER

[76] Inventor: Osmo K. Joronen, 204-450 Simcoe St., Victoria, B. C., Canada, V8V1L4

[21] Appl. No.: 73,138

[22] Filed: Sep. 6, 1979

[51] Int. Cl.³ .......................................... A01K 61/02
[52] U.S. Cl. .................................... 119/51 R; 119/54
[58] Field of Search .................... 119/51 R, 52 R, 54, 119/55, 56 A, 72.5, 75

[56] References Cited

U.S. PATENT DOCUMENTS

| | | | |
|---|---|---|---|
| 1,601,030 | 9/1926 | Love | 119/52 R |
| 2,503,886 | 4/1950 | Olson | 119/53.5 |
| 3,487,433 | 12/1969 | Fleming | 119/51 R |
| 3,643,632 | 2/1972 | Polrot | 119/54 |
| 3,677,230 | 7/1972 | Braden | 119/51 R |
| 3,688,743 | 9/1972 | Rack | 119/51 R |
| 3,688,744 | 9/1972 | Kaplan | 119/51.11 |
| 3,730,142 | 5/1973 | Kahrs et al. | 119/54 |
| 3,756,199 | 9/1973 | Clark | 119/72.5 |
| 4,006,716 | 2/1977 | Cross | 119/72.5 |

FOREIGN PATENT DOCUMENTS

| | | | |
|---|---|---|---|
| 970637 | 7/1975 | Canada | 119/51 R |
| 510208 | 6/1976 | U.S.S.R. | 119/54 |

Primary Examiner—Jay N. Eskovitz
Attorney, Agent, or Firm—Christensen, O'Connor, Johnson & Kindness

[57] ABSTRACT

A fish-actuated aquarium feeder is disclosed wherein a valve having a downwardly extending actuator rod is pivotably supported within a housing that is fastened to the wall of the aquarium. The upper surface of the valve is substantially dome-shaped with the periphery thereof including a series of circumferentially spaced-apart radially extending grooves. An inverted cannular container rests on the top of the dome-shaped valve surface to form a substantially closed storage chamber for fish food with the peripheral grooves lying outside the downwardly facing opening of the container when the valve is in its equilibrium position. When the fish deflect the actuator rod in the proper direction, the valve is rotated from the equilibrium position and permits a small portion of the fish food to fall downwardly into the water. Replaceable washer-like discs that form the contact region between the valve and the housing permit the force required to actuate the feeder to be established for properly feeding fish of various species and size.

6 Claims, 5 Drawing Figures

U.S. Patent   Jun. 2, 1981   4,270,489
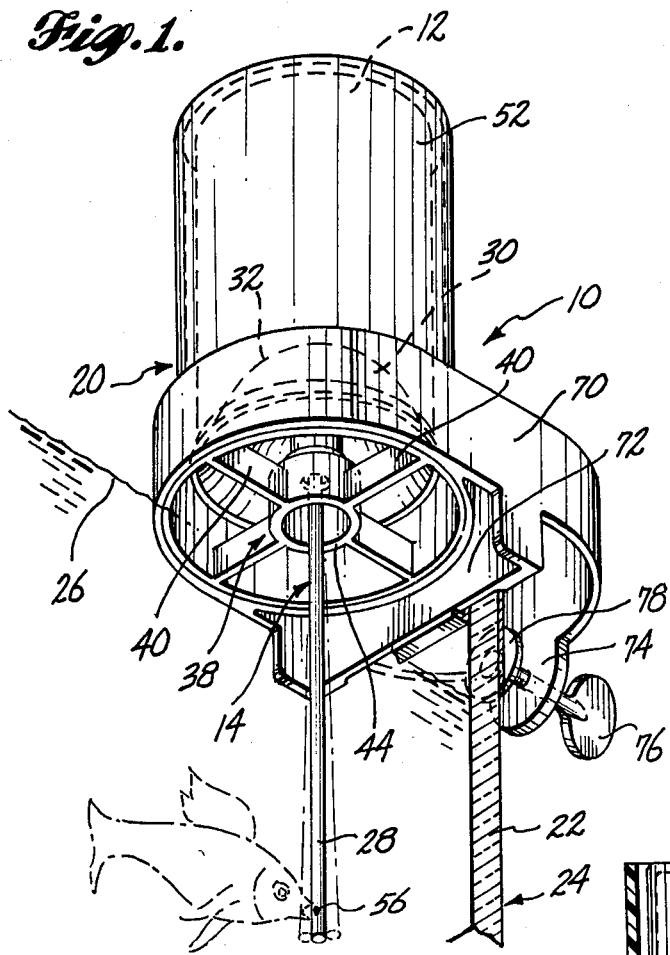
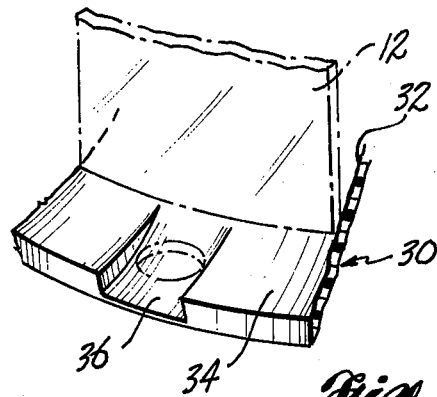
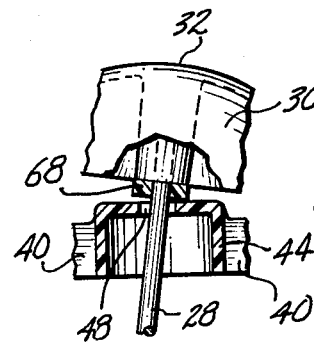
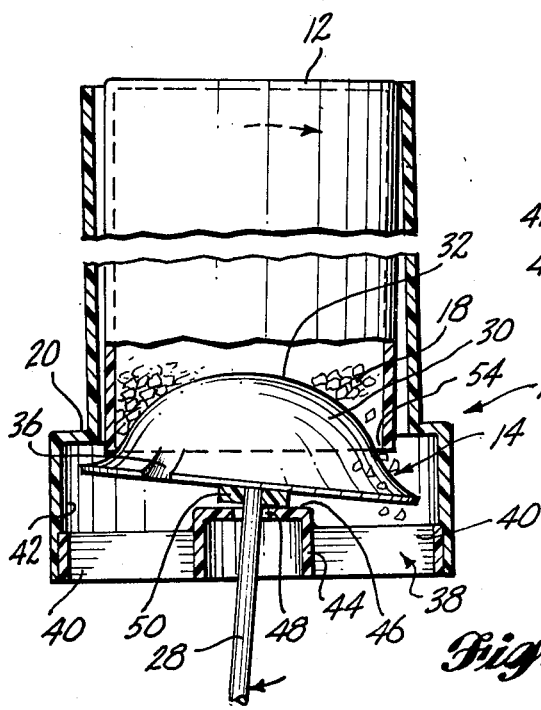
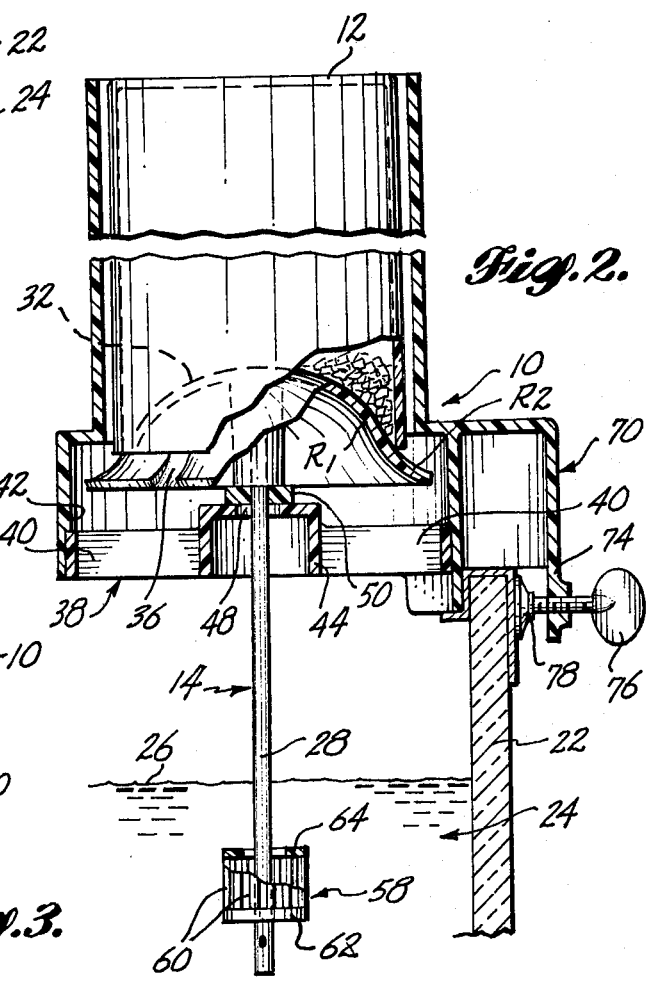

FISH-OPERATED AQUARIUM FEEDER

BACKGROUND OF THE INVENTION

This invention relates to devices for feeding fish, and more particularly, to apparatus that can be operated by the fish to dispense a small quantity of dried fish food.

One of the problems associated with raising fish for personal enjoyment or profit is proper feeding and care during periods in which no one is present to manually dispense the required amount of food. For example, many people who raise fish in an aquarium, or other tank-like enclosure are away from their residence during vacations and business trips. Since the health and well-being of virtually all types of fish depends on the availability of fairly small amounts of food at intervals not exceeding approximately one day, some arrangement must be made during more prolonged periods of absence.

Various prior art proposals have addressed this problem with the type of prior art device most pertinent to this invention being exemplified by U.S. Pat. No. 3,487,433, issued to Flemming; U.S. Pat. No. 3,643,632, issued to Poirot; and U.S. Pat. No. 3,688,743, issued to Rack. In this regard, each of the above-mentioned U.S. patents disclose a feeding device that dispenses fish food in response to forces applied by the fish when they are feeding or desire food. For example, the devices disclosed in the patents to Flemming and Rack each basically comprise a food-storage chamber or reservoir that is located above the surface of the water which contains the fish and an actuator rod that extends downwardly into the water. When the fish bump or otherwise disturb the actuator rod, a quantity of food is discharged through an opening in the lower portion of the storage chamber.

Although prior art apparatus, such as that disclosed in the above-mentioned patents, may perform satisfactorily under some circumstances, each such device appears to present one or more disadvantages or drawbacks. For example, because fish of various size are raised in aquariums and because of differences of the habits and feeding practice of various types of fish, certain fish may not be capable of displacing an actuator rod by the amount required to dispense a desired quantity of food. On the other hand, if the food dispenser is configured such that a relatively small force is required to actuate the food dispenser, overfeeding may result and/or the aquarium may become contaminated or fouled due to food that is not ingested by the fish. Further, the reliability of prior art fish food dispensers is not only affected by structural constraints that are inherent to each previously proposed arrangement, but such devices often become partially or wholly inoperative because of moisture that reaches the stored food supply.

In addition to the above problems, many prior art arrangements are relatively complex in structure and hence cannot be manufactured and sold at a cost that is economically attractive. Such structural complexity also often means that the procedure required to install and/or refill the dispenser is not as convenient as would be desired.

In view of the current state of the art, it is an object of this invention to provide a self-feeder for reliably dispensing suitable amounts of fish food during periods of time in which fish, maintained in an aquarium or other tank-like structure, are otherwise unattended.

It is another object of this invention to provide a self-feeder for dispensing fish food wherein the self-feeder is readily adapted for actuation by fish of various species and size.

It is yet another object of this invention to provide a self-feeder for dispensing substantially controlled quantities of fish food wherein the self-feeder is economical to manufacture and easily installed and maintained.

SUMMARY OF THE INVENTION

These and other objects are achieved in accordance with this invention by a fish food dispenser wherein a quantity of dried food particles or flakes is stored within an inverted cannular container that rests on the dome-shaped upper surface of a valve member. The dome-shaped portion of the valve member is contained within the lower portion of an outer housing or shell that is supported above the surface of the water with the lower surface of the valve member including an actuator rod that extends downwardly into the water. The diameter of the dome-shaped valve region is greater than the diameter of the inverted food storage container with the valve and outer housing being configured and arranged to establish a single equilibrium state in which the downwardly facing opening of the food container is sealed by the dome-shaped portion of the valve. In the disclosed embodiment of the invention the equilibrium position of the valve is established by a valve-mounting arrangement which includes an annular hub that is centrally mounted at or near the lower terminus of the outer housing by radially extending support members. The opening in the annular hub is sized such that the actuator rod freely passes therethrough and the valve rests on the support hub with the relatively flat, upper surface of the hub in abutment with an annular shoulder that concentrically surrounds the upper terminus of the actuator rod. With this arrangement, deflection of the downwardly extending actuator rod causes the valve to pivot out of the equilibrium position with a portion of the annular shoulder remaining in contact with the upper surface of the support hub. When the deflection forces are removed, the valve returns to the equilibrium position.

In accordance with the invention, the outer periphery of the dome-shaped portion of the valve includes a number of radially extending channel-like grooves that lie outside the edge of the downwardly facing opening in the food storage container when the valve is in the equilibrium position. As the actuator rod is deflected, the dome-shape portion of the valve rotates within the opening of the storage container so that a portion of the valve periphery moves inwardly toward the edge of the inverted container. If this portion of the periphery includes one of the channel-like grooves, a small portion of fish food is allowed to flow from the container and fall into the water. Since the channel-like grooves are dimensioned to permit only one or a few particles or flakes of food to pass outwardly during the time required for the valve to return to the equilibrium position, a single deflection of the actuator can only supply a small, substantially controlled amount of food. Further, the number of grooves utilized also controls the quantity of food that passes into the water since, except for fine, dust-like particles that may escape into the water, a very small quantity of food will be dispensed only when the actuator rod is deflected in a direction that moves one of the channel-like grooves into communication with the food container. For example, three equally spaced-apart grooves have been found satisfactory in an embodiment of the invention which employs a food container approximately two-inches high and one-inch in diameter that is intended to provide the food supply for two four-inch long fish for a period of approximately two weeks.

To maintain the inverted food container in a substantially vertical position during the food dispensing operation, the upper region of the outer housing of the disclosed embodiment coaxially surrounds the inverted food container and is spaced apart therefrom by a relatively small distance. Thus, if frictional forces between the edge of the container and the dome-shaped valve surface cause the food container to pivot or tip as the actuator rod is deflected, the upper end of the food container moves into abutment with an adjoining portion of the outer housing to thereby maintain the food container in a near vertical position. Regardless of whether or not the food container tips as the actuator rod is deflected, movement of the dome-shaped surface of the valve relative to the stored food causes fish food to move downwardly so that food is always available for passage through the channel-like grooves.

If desired, the outer housing and food container can be dimensioned such that a portion of the edge container moves away from the domed surface of the valve when the food container is tipped into abutment with the outer housing. This causes a small crack-like opening to be momentarily formed which, like small separations that may form during normal operation of the device, allows relatively small particles of food to pass outwardly and fall into the water.

In accordance with the preferred embodiment of the invention, the annular shoulder region fo the valve mechanism that rests on the valve-support arrangement is a replaceable, flat washer-like disc that is frictionally engaged with the actuator rod. This permits installation of various diameter discs to thereby control the force required to deflect the valve into a position in which food is dispensed. Such control allows a fish food dispenser of this invention to be readily adapted for feeding fish of various species and size. Moreover, it is often advantageous to utilize this feature of the invention and minimize the force required to dispense food when the dispenser is initially used. Once the fish come to associate deflection of the actuator with feeding, a disc that establishes a force requirement that is more compatible with the particular fish being cared for can be installed and the fish can be left attended only by the food dispenser.

If necessary or desired, a small basket-like container that is slidably retained on the submerged portion of the actuator rod can also be utilized during any necessary, initial "learning" period. When this container is filled with particles of fish food, fish will attempt to reach the food and displace the actuator rod, thereby causing the discharge of food from the inverted food container. Once the fish associate deflection of the actuator rod with feeding, the basket-like container may be removed. In many instances, use of the basket-like container is not necessary if the submerged portion of the actuator rod includes a small colored mark or dot. Such a mark or other visible indicia generally suffices in that most fish have a natural propensity to investigate small, foreign objects in a manner that will deflect the actuator rod.

BRIEF DESCRIPTION OF THE DRAWINGS

Other objects and advantages of the present invention will become apparent to one skilled in the art after reading the following description taken together with the accompanying drawings in which:

FIG. 1 is an isometric view of a fish food dispenser that is configured in accordance with this invention and mounted to the wall of an aquarium of fish tank.

FIG. 2 is a cross-sectional side elevation view of the fish food dispenser depicted in FIG. 1 which also illustrate a small, ancillary food container that can be utilized to encourage fish to operate the invention during initial period of use;

FIG. 3 is a partial side elevation view of the fish food dispenser of FIGS. 1 and 2 which illustrate operation of the invention;

FIG. 4 is a partial isometric view of a portion of the food container and valve mechanism of the invention which more clearly illustrates the provisions of the invention for dispensing flaked fish food; and, FIG. 5 is an enlarged view of a portion of the valve mechanism of the invention which illustrate the manner in which the force required to operate the invention is controlled.

DETAILED DESCRIPTION

As is illustrated in FIGS. 1 through 3, the aquarium self-feeder of this invention (generally denoted by the numeral 10) includes a cannular food container 12 that rests in an inverted position on the upper surface of a valve mechanism 14 to form a chamber or reservoir 16 for storing a quantity of flaked fish food 18. An outer housing, 20, which is mounted to a wall 22 of a tank or aquarium 24, supports valve mechanism 14 and food container 12 above the water level 26 of the aquarium 24.

As is most clearly illustrated in FIG. 2, the valve mechanism 14 includes an actuator rod 28 that extends downwardly from the central portion of a cap-like valve head 30 and into the water that contains the fish to be fed. The upper surface 32 of the valve head 30 is substantially dome-shaped with the center region thereof corresponding to a portion of a sphere of radius $R_1$ to completely seal the lower end of the food container 12 when the valve mechanism 14 is in the depicted vertical position. The outer region of the valve head upper surface 32 is contoured upwardly with a radius $R_2$ (which can be substantially equal to the primary radius $R_1$) to form a peripheral, flange-like region 34 that lies outside the boundary of the inverted container 12 when the valve mechanism 14 is in the vertical position. Channel-like slots, or grooves 36, that are circumferentially spaced-apart around the peripheral flange region 34 extend radially inward from the outer edge of the valve upper surface 32 to the inner edge of the flange region 34. Thus, as is depicted in the enlarged view of FIG. 4, the inner ends of the slots 36 are located slightly outside the boundary of the inverted food container 12 when the valve mechanism 14 is vertically oriented. As will be described more fully hereinafter, the slots 36 form gates or passages that permit a small quantity of the stored food 18 to escape from the food container 12 and fall downwardly into the water when the self-feeder is activated by the fish.

To support the valve mechanism 14 in the vertical position, the outer housing 20 includes a support ring 38 that is affixed to or integrably formed in the lower end of the outer housing 20. More specifically, the lower portion of the depicted outer housing is substantially tubular and the support ring 38 includes four circumferentially spaced-apart support arms 40 that extend radially inward from the inner wall 42 of the outer housing 20 to a cylindrical hub 44. The hub 44 is located at the center of the lower terminus of the outer housing 20 and includes a relatively flat, upper surface 46. An opening, 48, through the upper surface 46 of hub 44 is greater in diameter than the actuator rod 28 and thereby allows the valve mechanism 14 to rest on the hub upper surface 46. In this regard, the valve mechanism 14 further includes an annular shoulder 50 that fully abuts the hub upper surface 46 when the valve mechanism 14 is in the vertical position. Although the annular shoulder 50 can be integrably formed about the upper end of the actuator rod 28, the presently preferred embodiments of the invention utilize a flat, washer-like disc that can be slid onto and frictionally engaged with the actuator rod 28. This arrangement is advantageous in that the diameter of the annular shoulder region 50 establishes the force required to operate the fish food dispenser 10 and the use of replaceable washer-like discs permits the invention to be adapted to the particular feeding situation at hand.

In view of the above-described structural arrangement, it can be recognized that the valve mechanism 14 exhibits a single equilibrium state in which the lower end of the food container 12 is completely sealed by the dome-shaped upper surface 32 of the valve head 30 as shown in FIG. 2. More specifically, the weight of the inverted container 12 and fish food 18 force the valve head 30 downwardly so that the lower surface of the annular shoulder 50 is in full abutment with the support hub upper surface 46.

As is indicated by FIGS. 1 and 2, when a fish bumps or otherwise deflects the actuator rod 28, the valve mechanism 14 is tipped from the equilibrium position so that the dome-shaped upper surface 32 of the valve head 30 rotates within the open end of the food container 12. This causes a portion of the lower periphery of the food container 12 to slide outwardly onto the valve head flange region 34 and if this portion of the flanged region 34 includes a slot 36, a small portion of the fish food 18 passes through the slot and falls downwardly into the water. In this regard, the slots 36 are preferably dimensioned so that the width of each slot 36 is slightly larger than the individual flakes of fish food 18, which may be sifted or passed through a screen if necessary to ensure relatively uniform size. Since the downward force exerted by the food container 12 and stored fish food 18 rapidly restores the valve mechanism 14 to the equilibrium position, this means that only one or a small number of food flakes will be dispensed in any single deflection of the actuator rod 28. Further, in accordance with the invention, the total amount of food that is dispensed is controlled by suitably establishing the number of slots 36. For example, in one realization of the invention intended to provide food for two four-inch fish over a two-week interval, three equally spaced-apart slots 36 are employed so that a substantial portion of food is dispensed only when the actuator rod 28 is deflected in one of the three corresponding directions with lesser amounts of small food particles sometimes passing through small cracks or openings that may momentarily open when the actuator rod 28 is deflected in another direction.

Since frictional contact between the lower edge of the food container 12 and the valve head upper surface 32 may tend to also tip the food container 12 during deflection of the actuator rod 28, the outer housing 20 is preferably arranged to maintain food container 12 in a near vertical position. More specifically, as is shown in FIG. 3, the upper portion of the depicted outer housing 20 includes a tubular section 52 that coaxially surrounds and is slightly spaced-apart from the cylindrical walls of the food container 12. Thus, should the food container 12 tend to tip along with the valve head 30, the upper boundary of food container 12 comes into contact with the tubular section 52 and the food container 12 remains in a substantially upright position in which the food dispensing operation can occur. As is further depicted in FIG. 3, abutment of the food container 12 with the tubular section 52 can cause a small crack-like opening 54 to be momentarily formed between the valve head upper surface 32 and the lower edge of the food container 12. The small crack-like opening 54 and any other similar openings that are formed during deflection of the actuator rod 28 permit relatively fine particles of fish food that often accompany a flaked-type fish food to pass outwardly and fall into the water. Further, movement of valvehead 30 relative to food container 12 and the stored food 18 agitates or disturbs the stored food in a manner which causes both the full sized food particles and any dust-like accompanying particles to flow smoothly and continuously toward the periphal flange region 34 and slots 36.

Little or no "training" is generally required to acquaint the fish with the operation of the invention. In this regard, the submerged portion of the actuator rod 28 includes a mark 56 or other dot-like indicia that is preferably brown or another color that is highly visible under water. Since the mark 56 appears to be food or another small foreign object, most fish will investigate in a manner that displaces the actuator rod 28. For example, various fish exhibit different behavior patterns and may bump the region of the actuator rod 28 that includes the mark 56, may direct a stream of water at the mark 56 by rapid action of their mouth and gills, or may strike out at the mark 56 with their tail or other portion of their body. Once the fish have operated the food dispenser a number of times and cause food to fall into the water during at least some of the operations, an association is formed between the behavior utilized to displace the actuator rod 28 and the act of feeding. The fish will then operate the food dispenser whenever they desire food.

If desired or necessary, the fish can be further encouraged to operate the actuator rod 28 by installing a small basket-like container 58 on the lower portion of the actuator rod 28. As is illustrated in FIG. 2, the container 58 is substantially cylindrical and includes a number of spaced-apart rectangular strips 60 that extend between a lower annular ring 62 and an upper annular ring 64. In operation, food is placed in the basket 58 and the basket is installed to the actuator rod 28 which frictionally engages the opening in the lower annular ring 62. Once the fish are well acquainted with the operation of the food dispenser, the container 58 is generally no longer required and can be removed.

Regardless of whether or not the container 58 is utilized when the feeder is first used in a particular aquarium, it is generally advantageous to initially adjust the food dispenser 10 so that minimal force is required to deflect the actuator rod 28. In this regard, and as previously mentioned, the force required to operate the fish food dispenser 10 is a function of the diameter of the valve shoulder region 50 and this diameter is preferably established by a relatively flat, washer-like disc. More particularly, and with reference to FIGS. 3 and 5, displacement or the actuator rod 28 causes the valve head 30 to rotate about a point on the outer periphery of the disc being employed. Thus, the larger diameter disc 50 depicted in FIG. 3 requires a greater actuation force than the smaller disc 68 of FIG. 5. Thus, prior to leaving the fish attended only by the food dispenser 10, the small disc 68 can be frictionally engaged with the actuator rod 28 and the fish can be observed to determine that the fish are periodically operating the fish food dispenser. During this initial period, it may also be advantageous to place only a small amount of fish food in the container 12 to thereby further decrease the force necessary to displace the actuator rod 28 and dispense food. Once the fish have acquired the habit of operating the fish food dispenser 10 when they desire food, a disc that establishes a force requirement compatible with the type and size of fish container in the aquarium is installed, an amount of food adequate for the desired period placed in the food container 12 and the fish may be then be left attended only by a number of food dispensers 10 that is sufficient for the desired period.

Although a number of arrangements can be used for mounting a fish food dispenser constructed in accordance with this invention to an aquarium or other tank-like structure, the presently preferred arrangement comprises a one-piece mounting bracket 70 that supports the self-feeder 10 to the upwardly extending aquarium wall 22. As is illustrated in FIG. 1, the mounting bracket 70 includes a cylindrical opening for receiving the lower portion of the outer housing 20 with the bracket 70 preferably being removably affixed to the outer housing 20. To provide for attachment to the aquarium wall 22, the mounting bracket 70 extends tangentially outward from the cylindrical wall of the outer housing 20 and forms two downwardly extending plates 72 and 74 which are spaced apart by a distance which permits the mounting bracket 70 to be placed over the upper edge of conventionally dimensioned aquarium walls. A thumb screw 76 or other conventional fastener that is threadably engaged with an opening in the outer plate 74 of the mounting bracket is utilized to securely fasten the fish food dispenser to the aquarium wall 22. Preferably, the inner end of the thumb screw 76 includes a small pliant pad 78 that allows the self-feeder to be clamped tightly against the aquarium wall 22. In addition, the mounting bracket 70 and actuator rod 28 are dimensioned and arranged such that approximately two inches of the actuator rod will be submerged and the lower end of outer housing 20 positioned approximately two inches above the surface of the water.

Those skilled in the art will recognize that the embodiments of the invention disclosed herein are exemplary in nature and that various modifications and variations can be practiced without exceeding the scope and the spirit of the invention. For example, although the major components of the depicted embodiment are of substantially circular cross-sectional geometry, various other configurations can be utilized. Further, as is indicated by FIG. 4, the grooves 36 that provide the major passages for the dispensed fish food can include openings of holes that permit particles of fish food to fall downwardly without passing over the outer edge of the valve. Such openings may be advantageous if the invention is utilized to dispense a type of fish food other than the conventional flaked variety, e.g., a granular-type food.

The invention in which an exclusive property or privilege is claimed is defined as follows:

1. A fish-actuated feeder for dispensing substantially controlled quantities of stored fish food into a water-filled container that houses fish, said feeder comprising:
   a valve including a valve head having the upper surface thereof configured to define an upwardly-projecting, dome-shaped central region and an annular flange region that surrounds said dome-shaped central region, said annular flange including a plurality of circumferentially spaced apart grooves extending radially inward from the outer edge of said annular flange to the outer edge of said dome-shaped central region, each groove within said plurality of grooves having a width dimensioned to permit flow of a relatively small quantity of said stored food when fish food is supplied thereto, said valve further including an actuator rod extending downwardly from the lower portion of said valve head at a point in substantial alignment with the center of said domed upper surface of said valve head;
   a housing including support means for positioning said valve with said valve head above the surface of the water containing said fish to be fed with a portion of said actuator rod extending downwardly into said water, said support means and said valve being cooperatively configured and arranged to establish a single equilibrium position of said valve in which said dome-shaped upper surface of said valve head extends upwardly into said housing, said support means being further configured and arranged for pivotable movement of said valve head to rotate said dome-shaped upper surface relative to said housing when said actuator rod is subjected to angular deflection; and
   a food container for containing said stored fish food, said food container including a substantially cylindrical wall, a closed end and an open end, said food container being dimensioned and arranged for placement on said valve head with said open end of said food container facing downwardly with that portion of said cylindrical wall adjacent said opening resting on said valve head, said dome-shaped upper surface of said valve head being symmetrically disposed within said opening of said food container when said valve is in said equilibrium position to prevent escapement of stored fish food, said dome-shaped upper surface of said valve head being rotated to move a portion of said valve head annular flange inwardly beneath said cylindrical wall of said food container to supply said fish food to at least one of said circumferentially spaced apart grooves when said actuator rod is angularly deflected in a predetermined direction.

2. The fish-actuated feeder of claim 1 wherein said valve support means includes an annular hub mounted within the lower portion of said housing, said annular hub including a relatively flat upper surface having a central opening sized to permit said actuator rod to pass freely downwardly therethrough; and wherein said valve further includes an annular shoulder concentrically surrounding said actuator rod at the junction between said actuator rod and said valve head, said annular shoulder resting on said upper surface of said hub when said valve is in said single equilibrium position, said valve head pivoting about a portion of the periphery of said annular shoulder that contacts said upper surface of said hub when said actuator rod is subjected to said angular deflection, said annular shoulder having a predetermined diameter that is selected to control the force required to pivot said valve head about the periphery of said annular shoulder.

3. The fish-actuated feeder of claim 2 wherein said annular shoulder of said valve comprises a replaceable annular disc having a central opening dimensioned for frictional engagement of said actuator rod.

4. The fish-actuated feeder of claims 2 or 3 wherein said housing includes an upwardly extending tubular region concentrically surrounding and spaced-apart from said tubular shell that defines said food container to maintain said food container in a substantially upright position.

5. The fish-actuated feeder of claim 4 wherein said housing means further includes means for mounting said feeder to a wall region of said water-filled container housing said fish.

6. The fish actuated feeder of claims 1 or 2 further comprising second food container means, said second food container means being configured and arranged for frictional engagement with a submerged portion of said actuator rod to induce said fish to angularly deflect said actuator rod.

* * * * *

UNITED STATES PATENT AND TRADEMARK OFFICE
CERTIFICATE OF CORRECTION

PATENT NO. : 4,270,489

DATED : June 2, 1981

INVENTOR(S) : Osmo K. Joronen

It is certified that error appears in the above—identified patent and that said Letters Patent is hereby corrected as shown below:

Column 3, line 35, "fo" should read -- of --.

Column 4, line 9, "of" should read -- or --.

Column 4, line 14, "period" should read -- periods --.

Column 4, line 16, "illustrate" should read -- illustrates --.

Column 7, line 25, delete "be" (first occurrence)

Signed and Sealed this

Fifteenth Day of September 1981

[SEAL]

Attest:

Attesting Officer

GERALD J. MOSSINGHOFF

Commissioner of Patents and Trademarks